US012258735B2

(12) United States Patent
Hu et al.

(10) Patent No.: US 12,258,735 B2
(45) Date of Patent: Mar. 25, 2025

(54) ANTI-OVERTURNING WARNING METHOD AND APPARATUS FOR WORK MACHINE, WORK MACHINE AND ELECTRONIC DEVICE

(71) Applicant: SHANGHAI SANY HEAVY MACHINERY CO., LTD, Shanghai (CN)

(72) Inventors: Lixin Hu, Shanghai (CN); Shouming Li, Shanghai (CN)

(73) Assignee: SHANGHAI SANY HEAVY MACHINERY CO., LTD, Shanghai (CN)

( * ) Notice: Subject to any disclaimer, the term of this patent is extended or adjusted under 35 U.S.C. 154(b) by 0 days.

(21) Appl. No.: 18/409,427

(22) Filed: Jan. 10, 2024

(65) Prior Publication Data

US 2024/0141620 A1 May 2, 2024

Related U.S. Application Data

(63) Continuation of application No. PCT/CN2022/095606, filed on May 27, 2022.

(30) Foreign Application Priority Data

Jul. 22, 2021 (CN) ......................... 202110830053.6

(51) Int. Cl.
*E02F 9/26* (2006.01)
*E02F 9/24* (2006.01)
*G08B 21/02* (2006.01)

(52) U.S. Cl.
CPC .................. *E02F 9/26* (2013.01); *E02F 9/24* (2013.01); *G08B 21/02* (2013.01)

(58) Field of Classification Search
CPC ...... E02F 9/26; E02F 9/24; E02F 9/00; G08B 21/02
See application file for complete search history.

(56) References Cited

U.S. PATENT DOCUMENTS 9,002,557 B2 * 4/2015 Goncalves ................ B66F 9/24 701/22
2018/0230673 A1 * 8/2018 Lee ......................... E02F 3/427
2020/0399105 A1 * 12/2020 Draayer .............. B66F 9/07504

FOREIGN PATENT DOCUMENTS

CN 204384774 U 6/2015
CN 105822264 A 8/2016
(Continued)

OTHER PUBLICATIONS

First Office Action issued in counterpart Chinese Patent Application No. 202110830053.6, dated Jul. 20, 2022.
(Continued)

*Primary Examiner* — Brian Wilson
(74) *Attorney, Agent, or Firm* — Westbridge IP LLC

(57) ABSTRACT

Disclosed are an anti-overturning warning method and an anti-overturning warning apparatus for a work machine, a work machine and an electronic device. The anti-overturning warning method includes: acquiring a plurality of positive pressures collected by a plurality of pressure sensors. The plurality of pressure sensors are respectively provided at a plurality of supporting wheels of the work machine; obtaining an intersection point where a gravity direction of the work machine intersects a ground based on the plurality of positive pressures; and obtaining an outer contour of the plurality of supporting wheels, and performing a warning of an overturning risk of the work machine based on the intersection point and the outer contour of the plurality of supporting wheels.

8 Claims, 5 Drawing Sheets

(56) References Cited

FOREIGN PATENT DOCUMENTS

| | | | |
|---|---|---|---|
| CN | 205580440 | U | 9/2016 |
| CN | 106087809 | A | 11/2016 |
| CN | 207833664 | U | 9/2018 |
| CN | 109048942 | A | 12/2018 |
| CN | 112758011 | A | 5/2021 |
| CN | 112875583 | A | 6/2021 |
| CN | 113724469 | A | 11/2021 |
| JP | H01222316 | A | 9/1989 |
| JP | H05116081 | A | 5/1993 |
| JP | H0861918 | A | 3/1996 |
| JP | 2000099179 | A | 4/2000 |
| WO | 2016059794 | A1 | 4/2016 |
| WO | 2018092980 | A1 | 5/2018 |
| WO | 2021072919 | A1 | 4/2021 |

OTHER PUBLICATIONS

Grant Notification issued in counterpart Chinese Patent Application No. 202110830053.6, dated Nov. 22, 2022.

International Search Report and Written Opinion issued in corresponding PCT Application No. PCT/CN2022/095606, dated Aug. 9, 2022.

* cited by examiner

ANTI-OVERTURNING WARNING METHOD AND APPARATUS FOR WORK MACHINE, WORK MACHINE AND ELECTRONIC DEVICE

CROSS-REFERENCE TO RELATED APPLICATIONS

This application is a continuation application of International Application No. PCT/CN2022/095606, filed on May 27, 2022, which claims priority to Chinese Patent Application No. 202110830053.6, filed on Jul. 22, 2021. The disclosures of the above-mentioned applications are incorporated herein by reference in their entireties.

TECHNICAL FIELD

The present application relates to the technical field of engineering, in particular to an anti-overturning warning method for a work machine, an anti-overturning warning apparatus for a work machine, a work machine and an electronic device.

BACKGROUND

When the work machine operates on a complex ground, there is a risk of overturning. Currently, in order to prevent work machine from overturning, gravity sensors, inclination sensors, etc. are installed on various parts of the vehicle body to determine the state of each component of the work machine. Then, the coordinate of the center of gravity of the total vehicle are calculated based on all the states, and finally it can be determined that whether there is a risk of overturning when the center of gravity is at such a position according to the principle of force balance.

In the existing technical solution, the overturning risk is determined by installing gravity sensors on various parts of the vehicle body to calculate the center of gravity of the work machine. When the surrounding environment of the operating machine changes, this judgment method may lead to the risk of misjudgment. For example, when the work machine travels onto a piece of soft soil or a landslide, it may be too late to alert after the work machine changes its posture due to changes in the environment. In such case, the overturning may not be prevented. Therefore, the existing anti-overturning warning method for work machine has the risk of untimely overturning warning and incorrect judgment.

SUMMARY

The present application provides an anti-overturning warning method and an anti-overturning warning apparatus for a work machine, a work machine and an electronic device, aiming to solve the shortcomings in the existing technology of untimely overturning warning and the risk of incorrect judgment, and further to improve the accuracy of judgment of overturning risk of work machine, and provide timely overturning warning of work machine.

In order to achieve the above objective, the present application provides an anti-overturning warning method for a work machine, including:

acquiring a plurality of positive pressures collected by a plurality of pressure sensors, where the plurality of pressure sensors are respectively provided at a plurality of supporting wheels of the work machine;

obtaining an intersection point where a gravity direction of the work machine intersects a ground based on the plurality of positive pressures; and obtaining an outer contour of the plurality of supporting wheels, and performing a warning of an overturning risk of the work machine based on the intersection point and the outer contour of the plurality of supporting wheels.

According to the anti-overturning warning method for the work machine provided by the present application, the obtaining the intersection point where the gravity direction of the work machine intersects the ground based on the plurality of positive pressures includes:

decomposing the plurality of positive pressures along coordinate axis directions to obtain a plurality of horizontal axis pressures and a plurality of vertical axis pressures in a target coordinate system, where the target coordinate system includes a horizontal axis and a vertical axis, the horizontal axis is a front and rear direction of the work machine, and the vertical axis is a direction perpendicular to the front and rear direction of the work machine and parallel to the ground; and obtaining a coordinate of the intersection point based on the plurality of horizontal axis pressures, the plurality of vertical axis pressures and the plurality of positive pressures.

According to the anti-overturning warning method for the work machine provided by the present application, the outer contour of the plurality of supporting wheels includes coordinates of vertex supporting wheels among the plurality of supporting wheels in the target coordinate system;

the performing the warning of the overturning risk of the work machine based on the intersection point and the outer contour of the plurality of supporting wheels includes:

obtaining an overturning warning boundary of the work machine based on the coordinates of the vertex supporting wheels; and performing the warning of the overturning risk of the work machine based on the coordinate of the intersection point and the overturning warning boundary.

According to the anti-overturning warning method for the work machine provided by the present application, the obtaining the overturning warning boundary of the work machine based on the coordinates of the vertex supporting wheels includes:

dividing the coordinates of the vertex supporting wheels by a target safety factor to obtain the overturning warning boundary, where the target safety factor is greater than 1.

According to the anti-overturning warning method for the work machine provided by the present application, the performing the warning of the overturning risk of the work machine based on the coordinates of the intersection point and the overturning warning boundary includes:

in response to that the coordinate of the intersection point is out of the overturning warning boundary, obtaining an overturning risk level based on a coordinate of the vertex supporting wheels at a current moment, a coordinate of the intersection point at the current moment, a coordinate of the intersection point at a previous moment and a time difference between the current moment and the previous moment; and performing the warning based on the overturning risk level.

According to the anti-overturning warning method for the work machine provided by the present application, the obtaining the overturning risk level based on the coordinate of the vertex supporting wheels at the current moment, the coordinate of the intersection point at the current moment, the coordinate of the intersection point at the previous moment and the time difference between the current moment and the previous moment includes: calculating an equivalent overturning time based on a following formula:

$$T_f = \frac{|C_e - C_O(t)|^* \Delta t}{|C_O(t) - C_O(t - \Delta t)|}$$

where $T_f$ represents the equivalent overturning time, $\Delta t$ represents the time difference between the current moment and the previous moment, $C_e$ represents an abscissa absolute value of the vertex supporting wheel, $C_O(t)$ represents an abscissa of the intersection point at the current moment and $C_O(t-\Delta t)$ represents an abscissa of the intersection point at the previous moment; or $C_e$ represents an ordinate absolute value of the of the vertex supporting wheel, and $C_O(t)$ represents an ordinate of the intersection point at the current moment; $C_O(t-\Delta t)$ represents an ordinate of the intersection point at the previous moment; and obtaining the overturning risk level based on the equivalent overturning time, where the overturning risk level has an inverse relationship with the equivalent overturning time.

The present application further provides an anti-overturning warning apparatus for a work machine, including:

an acquiring module, configured to acquire a plurality of positive pressures collected by a plurality of pressure sensors, where the plurality of pressure sensors are respectively provided at a plurality of supporting wheels of the work machine;

a calculating module, configured to obtain an intersection point where a gravity direction of the work machine intersects a ground based on the plurality of positive pressures; and a pre-warning module, configured to obtain an outer contour of the plurality of supporting wheels, and performing a warning of an overturning risk of the work machine based on the intersection point and the outer contour of the plurality of supporting wheels.

The present application further provides a work machine including the above-mentioned anti-overturning warning apparatus for the work machine The present application further provides an electrical device, including a memory, a processor, and a computer program stored on the memory and executable on the processor, when the processor executes the computer program, steps of the above-mentioned anti-overturning warning method for the work machine are performed.

The present application further provides a non-transitory computer-readable storage medium with a computer program stored thereon, when the computer program is executed by a processor, steps of the above-mentioned anti-overturning warning method for the work machine are performed.

The present application provides an anti-overturning warning method and an apparatus for a work machine, a work machine and an electronic device. The technical solution is achieved through the positive pressures collected by the pressure sensor at the supporting wheels, that is, the reverse force exerted by the ground on the corresponding supporting wheels, but not through the gravity distribution data collected by gravity sensors installed in various parts of the work machine.

Since the road conditions on which the work machine is running are the direct factors that affect the overturning of the work machine, the method provided by the present application fully considers the road conditions of the driving road, and can accurately detect the work machine even if the work machine is driving on a loose road or a cliff. The gravity distribution of the work machine is then calculated, afterward the location of the intersection point between the gravity direction of the work machine and the ground is calculated, then based on the location of the intersection point and the outer contour positions of the plurality of supporting wheels, it is judged whether the work machine will be in danger of overturning, and finally based on the judgment, a warning for overturning risk is performed.

By calculating the position of the intersection point of the gravity direction of work machine intersecting the ground through the positive pressures at the supporting wheels, the accuracy of the calculation results of the intersection point of the gravity direction of the work machine intersecting the ground is improved. Even when the road conditions on which the work machine is traveling change, in this way, the calculated position of the intersection point of the gravity direction of the work machine intersecting the ground will change accordingly, and timely warning is provided to avoid warning after the work machine overturns. Therefore, the method provided by the present application improves the accuracy of overturning warning and reduces the situation of incorrect warning.

BRIEF DESCRIPTION OF THE DRAWINGS

In order to more clearly illustrate the technical solutions in the embodiments of the present application or in the related art, drawings in the embodiments or in the related art will be briefly described below. Obviously, the drawings in the following description are only some embodiments of the present application. Other drawings can be obtained by those skilled in the art according to the structures shown in the drawings without creative efforts.

DETAILED DESCRIPTION OF THE EMBODIMENTS

In order to make the purpose, technical solutions and advantages of the present application more clear, the technical solutions in the present application will be clearly and completely described below in conjunction with the accompanying drawings of the present application. Obviously, the described embodiments are part of the embodiments of the present application, not all examples. Based on the embodiments of the present application, all other embodiments obtained by those of ordinary skill in the art without making creative efforts fall within the scope of protection of the present application.

The anti-overturning warning method and the anti-overturning warning apparatus for a work machine, work machine and electronic device of the present application will be described below with reference to FIG. 1 to FIG. 7.

Figure 1:
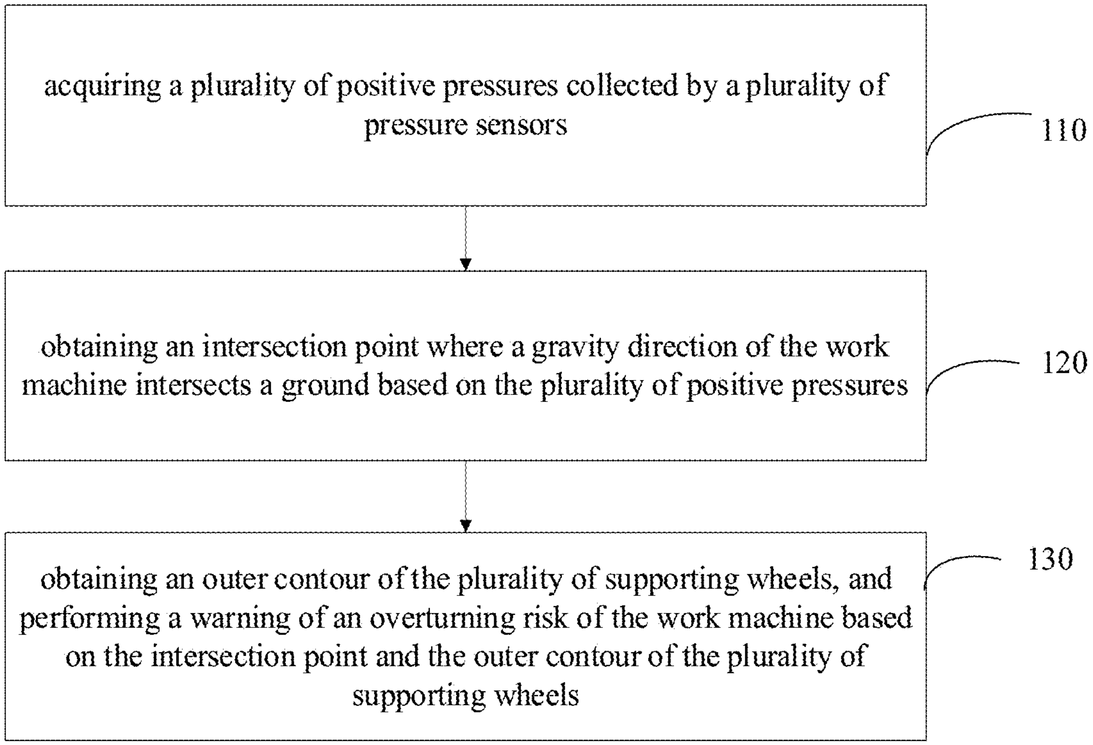
FIG. 1 is a schematic flowchart of an anti-overturning warning method for a work machine according to some embodiments of the present application.
Figure 2:
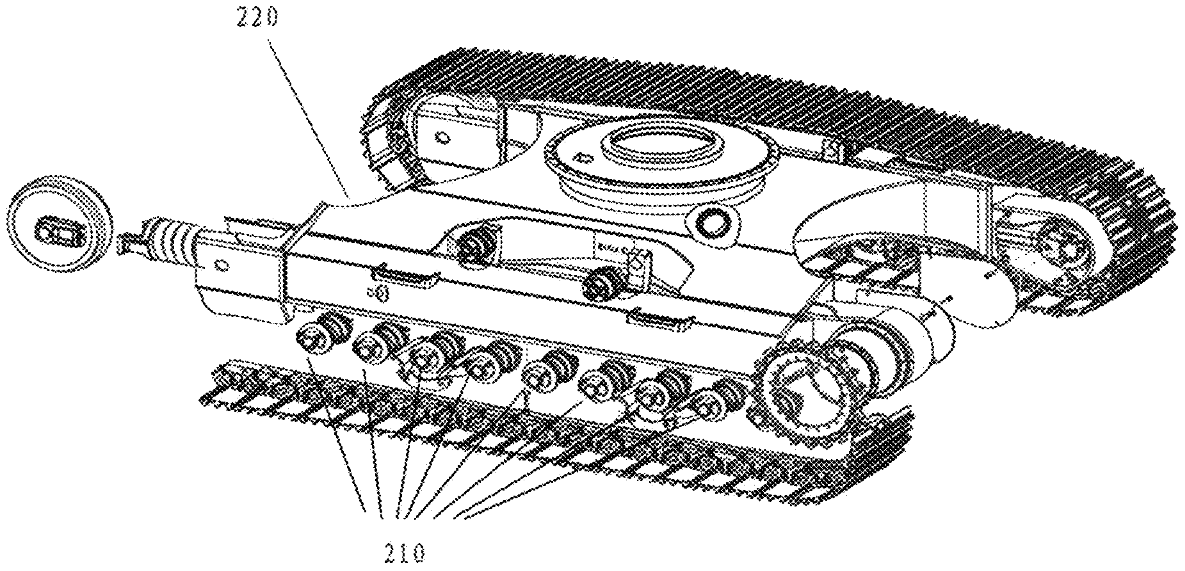
FIG. 2 is a schematic view of supporting wheels of the work machine according to some embodiments of the present application.

As shown in FIG. 1, the present application proposes an anti-overturning warning method for a work machine, including:

Step 110, acquiring a plurality of positive pressures collected by a plurality of pressure sensors, where the plurality of pressure sensors are respectively provided at a plurality of supporting wheels 210 of the work machine as shown in FIG. 2.

It can be understood that the work machine may be an excavator, and the plurality of supporting wheels 210 are respectively located on the chassis 220 of the work machine.

Since the change in the center of gravity of the work machine is most directly reflected in the change in the distribution of the positive pressures in contact between the work machine and the ground. In the method provided by the present application, pressure sensors are installed at each supporting wheel 210 of the vehicle body under the work machine. The pressure sensors can collect the positive pressures at a plurality supporting wheels 210.

Step 120, obtaining an intersection point where a gravity direction of the work machine intersects a ground based on the plurality of positive pressures.

Figure 3:
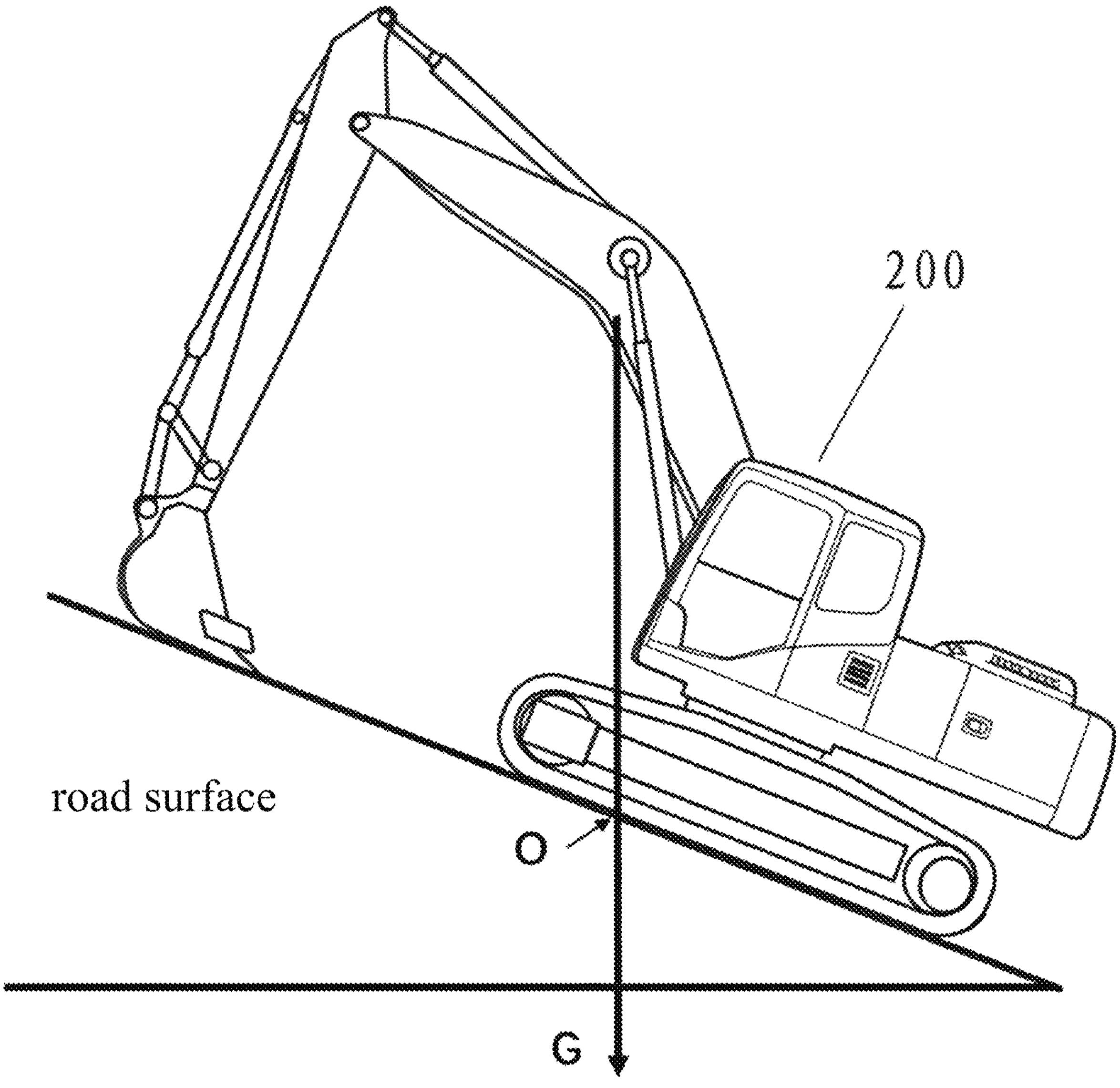
FIG. 3 is a schematic structural view of an intersection point where a gravity direction of the work machine intersects a ground according to some embodiments of the present application.

In some embodiments, the intersection point O where the gravity G of the work machine intersects the ground is as shown in FIG. 3.

It can be understood that the positive pressures at the supporting wheels 210 are the pressure exerted by the supporting wheels 210 in a direction perpendicular to the ground. After the plurality of pressure sensors can collect the positive pressures at the plurality of supporting wheels 210, the coordinate of the intersection O where the gravity G of the work machine 200 intersects the ground can be calculated.

Step 130, obtaining outer contour of the plurality of supporting wheels 210, and performing a warning of an overturning risk of the work machine 200 based on the intersection point and the outer contour of the plurality of supporting wheels 210.

It can be understood that the relative positional relationship between the intersection point and the outer contour of the plurality of supporting wheels 210 can be determined based on the position of the intersection point and the outer contour positions of the plurality of supporting wheels 210. If the intersection point is not within the outer contour of the plurality of supporting wheels 210, it may indicate that the work machine 200 is in risk of overturning. Therefore, through the position of the intersection point and the outer contour position of the plurality of supporting wheels 210, a warning of the overturning risk of the work machine 200 can be achieved.

Figure 4:
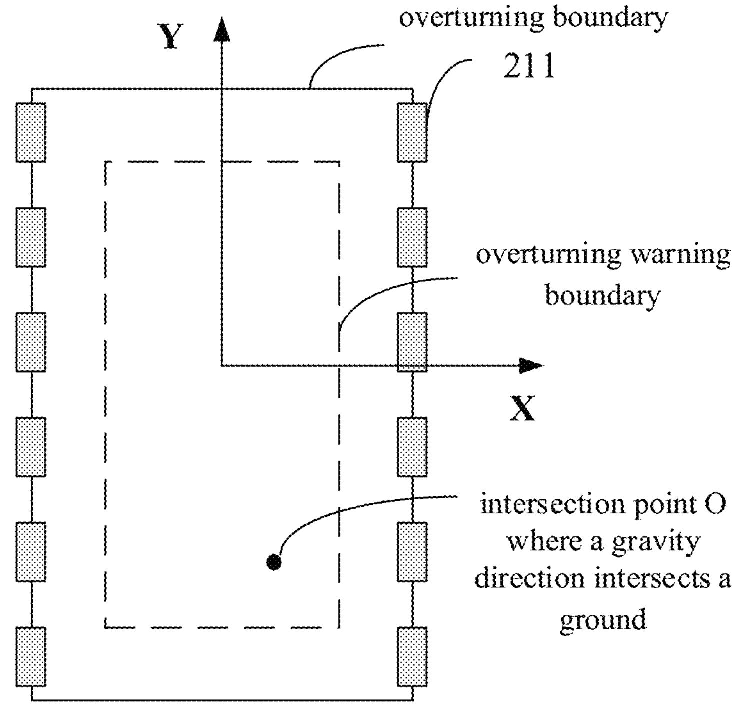
FIG. 4 is a schematic view of an overturning warning boundary according to some embodiments of the present application.

In some embodiments, the obtaining the intersection point where the gravity direction of the work machine 200 intersects the ground based on the plurality of positive pressures includes:

decomposing the plurality of positive pressures along coordinate axis directions to obtain a plurality of horizontal axis pressures and a plurality of vertical axis pressures in a target coordinate system, where the target coordinate system includes a horizontal axis and a vertical axis, the horizontal axis is a front and rear direction of the work machine 200, and the vertical axis is a direction perpendicular to the front and rear direction of the work machine 200 and parallel to the ground. The coordinate origin can be the center point of the plurality of pressure sensors, or it can be the position of the pressure sensor at the vertex supporting wheels 211 as shown in FIG. 4.

obtaining a coordinate of the intersection point based on the plurality of horizontal axis pressures, the plurality of vertical axis pressures and the plurality of positive pressures.

It should be noted that in the target coordinate system, the left and right directions of the work machine 200 are the horizontal axis, and the front and rear directions of the work machine 200 are the vertical axis. The front and rear directions of the work machine 200 are the forward and backward directions of the work machine 200, and the left and right directions of the work machine 200 are the directions perpendicular to the front and rear directions of the work machine 200.

It can be understood that based on the plurality of horizontal axis pressures, the plurality of vertical axis pressures and the plurality of positive pressures, the coordinate of the intersection point can be obtained. That is, based on the plurality of horizontal axis pressures and the plurality of positive pressures, the horizontal axis coordinate of the intersection point can be calculated, and based on the plurality of vertical axis pressures and the plurality of positive pressures, the vertical axis coordinate of the intersection point can be calculated.

Assume that the coordinates of pressure sensors No. 1 to No. M in the target coordinate system are (x1,y), . . . , (xm,ym), and the pressure reading values of the pressure sensors are N1(t), . . . , Nm(t), then the abscissa $x_O(t)$ of the intersection point O is:

$$x_O(t) = \frac{\sum_{i=1}^{m} N_i(t)x_i}{\sum_{i=1}^{m} N_i(t)}$$

The ordinate $y_O(t)$ of the intersection point O is:

$$y_O(t) = \frac{\sum_{i=1}^{m} N_i(t)y_i}{\sum_{i=1}^{m} N_i(t)}$$

$N_i(t)x_i$ is the horizontal axis pressure of $N_i(t)$, and $N_i(t)y_i$ is the vertical axis pressure of $N_i(t)$.

In some embodiments, as shown in FIG. 4, the outer contour of the plurality of supporting wheels includes coordinates of vertex supporting wheels among the plurality of supporting wheels in the target coordinate system.

It should be noted that the outer contour of the plurality of supporting wheels 210 includes the supporting wheels 210 at the four vertices, that is, the vertex supporting wheels 211.

The performing the warning of the overturning risk of the work machine 200 based on the intersection point and the outer contour of the plurality of supporting wheels 210 includes:

obtaining an overturning warning boundary of the work machine 200 based on the coordinate of the vertex supporting wheels 211; and performing the warning of the overturning risk of the work machine 200 based on the coordinate of the intersection point and the overturning warning boundary.

It should be noted that when the coordinate of the intersection point cross the overturning warning boundary, a warning of the overturning risk of the work machine 200 is provided. If the coordinate of the intersection point do not cross the overturning warning boundary, no warning of the overturning risk of the work machine 200 will be provided.

The overturning warning boundary of the work machine 200 is shown in FIG. 4. It should be noted that the overturning boundary is the critical position where the work machine 200 overturns. Therefore, the overturning warning boundary can be set inside the overturning boundary, and the work machine 200 will send a warning when the work machine 200 is going to overturn.

It should be noted that based on the coordinates of the vertex supporting wheels 211, obtaining the overturning warning boundary of the work machine 200, including:

Based on the abscissas of the vertex supporting wheels 211, obtaining the horizontal axis overturning warning boundary of the work machine 200;

Based on the ordinates of the vertex supporting wheels 211, obtaining the vertical overturning warning boundary of the work machine 200.

Based on the coordinates of the intersection point and the overturning warning boundary, the overturning risk of the work machine 200 is warned, including:

Based on the abscissa and ordinate of the intersection point, as well as the horizontal axis overturning warning boundary and the vertical axis overturning warning boundary, the overturning risk of the work machine 200 is warned.

It should be noted that if the abscissa of the intersection crosses the horizontal axis overturning warning boundary, or the ordinate of the intersection crosses the vertical axis overturning warning boundary, a warning of the overturning risk of the work machine 200 is provided.

If the abscissa of the intersection point does not cross the horizontal axis overturning warning boundary, and the ordinate of the intersection point does not cross the vertical axis overturning warning boundary, no warning of the overturning risk of the work machine 200 is provided.

In some embodiments, the obtaining the overturning warning boundary of the work machine 200 based on the coordinate of the vertex supporting wheels 211 includes:

dividing the coordinates of the vertex supporting wheels 211 by a target safety factor to obtain the overturning warning boundary, where the target safety factor is greater than 1.

It can be understood that if the coordinate of the intersection O falls on the boundary of the supporting wheels 210, it means that overturning is occurring or has occurred, so a safety factor k (k>1) needs to be set. Such that the center of gravity G of the work machine 200 needs to be constrained within the overturning warning boundary as shown in FIG. 4, which means that the work machine 200 is safe and has no risk of overturning.

The coordinates of each vertex supporting wheel 211 are $(x_e,y_e)$, $(x_e,-y_e)$ $(-x_e,y_e)$,$(-x_e,-y_e)$, $(x_e,y_e>0)$, then the overturning safety range of the work machine 200 meets:

$$-\frac{x_e}{k} < x_O(t) < \frac{x_e}{k};\text{ and}$$

$$-\frac{y_e}{k} < y_O(t) < \frac{y_e}{k}.$$

If the following conditions are met, it means that the work machine 200 is in risk of overturning:

$$|x_O(t)| \geq \frac{x_e}{k};\text{ or}$$

$$|y_O(t)| \geq \frac{y_e}{k}.$$

In some embodiments, the performing the warning of the overturning risk of the work machine based on the coordinate of the intersection point and the overturning warning boundary includes:

in response to that the coordinate of the intersection point is out of the overturning warning boundary, obtaining an overturning risk level based on a coordinate of the vertex supporting wheels 211 at a current moment, a coordinate of the intersection point at the current moment, a coordinate of the intersection point at a previous moment and a time difference between the current moment and the previous moment; and performing the warning based on the overturning risk level.

It should be noted that the overturning risk level represents the urgency and possibility of the overturning risk of the work machine 200. The higher the overturning risk level, the easier and faster the work machine 200 will be in risk of overturning.

In some embodiments, the obtaining an overturning risk level based on the coordinate of the vertex supporting wheels at the current moment, the coordinate of the intersection point at the current moment, the coordinate of the intersection point at the previous moment and the time difference between the current moment and the previous moment includes:

calculating an equivalent overturning time based on a following formula:

$$T_f = \frac{|C_e - C_O(t)|^* \Delta t}{|C_O(t) - C_O(t - \Delta t)|}$$

$T_f$ represents the equivalent overturning time, $\Delta t$ represents the time difference between the current moment and the previous moment, $C_e$ represents an abscissa absolute value of the vertex supporting wheel, $C_O(t)$ represents an abscissa of the intersection point at the current moment and $C_O(t-\Delta t)$ represents an abscissa of the intersection point at the previous moment; or $C_e$ represents an ordinate absolute value of the of the vertex supporting wheel, and $C_O(t)$ represents an ordinate of the intersection point at the current moment; $C_O(t-\Delta t)$ represents an ordinate of the intersection point at the previous moment; and obtaining the overturning risk level based on the equivalent overturning time, where the overturning risk level has an inverse relationship with the equivalent overturning time.

When the intersection point O reaches or crosses the overturning warning boundary, the warning level can be determined based on the change rate of the intersection point O away from the overturning warning boundary. For example, the warning level can be divided into alarm only, output gear reduction, shutdown, etc.

It can be understood that based on the following formula, the equivalent overturning time of the work machine 200 in the horizontal axis direction is calculated.

$$T_{f1} = \frac{|x_e - x_O(t)|^* \Delta t}{|x_O(t) - x_O(t - \Delta t)|}$$

$T_{f1}$ represents the equivalent overturning time in the horizontal axis direction of the work machine 200, $x_e$ represents the abscissa of the vertex supporting wheels 211, $x_O(t)$ represents the abscissa of the intersection point at the current moment, $x_O(t-\Delta t)$ represents the abscissa of the intersection point at the previous moment, and $\Delta t$ represents the time difference between the current moment and the previous moment.

Based on the following formula, the equivalent overturning time in the vertical axis direction of the work machine 200 is calculated.

$$T_{f2} = \frac{|y_e - y_O(t)|^* \Delta t}{|y_O(t) - y_O(t - \Delta t)|}$$

$T_{f2}$ represents the equivalent overturning occurrence time in the vertical axis direction of the work machine 200, $y_e$ represents the ordinate of the vertex supporting wheels 211, $y_O(t)$ represents the ordinate of the intersection point at the current moment, $y_O(t-\Delta t)$ represents the ordinate of the intersection point at the previous moment, and $\Delta t$ represents the time difference between the current moment and the previous moment.

t can be a certain moment, such as the current moment, and $\Delta t$ can be the time interval between two readings of the pressure sensor.

The smaller $T_{f1}$ or $T_{f2}$ is, the higher the risk level of overturning of the work machine 200 is, and the greater the need for intervention. Furthermore, the smaller $T_{f1}$ is, the higher the risk level of overturning of the work machine 200 in the horizontal axis direction; the smaller $T_{f2}$ is, the higher the risk level of overturning of the work machine 200 in the vertical axis direction.

In conclusion, in the anti-overturning warning method of a work machine provided by the present application, a plurality of positive pressures is obtained and collected by pressure sensors respectively provided at a plurality of supporting wheels 210; and then based on the plurality of positive pressures, the intersection point of the gravity direction of the work machine 200 intersecting the ground is obtained; finally, the outer contour of the plurality of supporting wheels 210 is obtained, and based on the intersection point and the outer contour of the plurality of supporting wheels 210, the warning for overturning risk of the work machine 200 is performed.

In the method provided by the present application, the positive pressures collected by the pressure sensor at the supporting wheels 210 is the reverse force exerted by the ground on the corresponding supporting wheels 210, rather than the gravity distribution data collected by gravity sensors installed in various parts of the work machine 200.

Since the road conditions on which the work machine 200 is running are the direct factors that affect the overturning of the work machine 200, the method provided by the present application fully considers the road conditions of the driving road, and can accurately detect the work machine even if the work machine 200 is driving on a loose road or a cliff. The gravity distribution of the work machine 200 is then calculated, afterward the location of the intersection point between the gravity direction of the work machine 200 and the ground is calculated, then based on the location of the intersection point and the outer contour positions of the plurality of supporting wheels 210, it is judged whether the work machine 200 will be in risk of overturning, and finally based on the judgment, a warning for overturning risk is performed.

By calculating the position of the intersection point of the gravity direction of work machine 200 intersecting the ground through the positive pressures at the supporting wheels 210, the accuracy of the calculation results of the intersection point of the gravity direction of the work machine 200 intersecting the ground is improved. Even when the road conditions on which the work machine 200 is traveling change, in this way, the calculated position of the intersection point of the gravity direction of the work machine 200 intersecting the ground will change accordingly, and timely warning is provided to avoid warning after the work machine 200 overturns. Therefore, the method provided by the present application improves the accuracy of overturning warning and reduces the situation of incorrect warning.

The anti-overturning warning apparatus of the work machine 200 provided by the present application is described below. The anti-overturning warning apparatus of the work machine 200 described below and the anti-overturning warning method of the work machine 200 described above can be mutually referenced.

Figure 5:
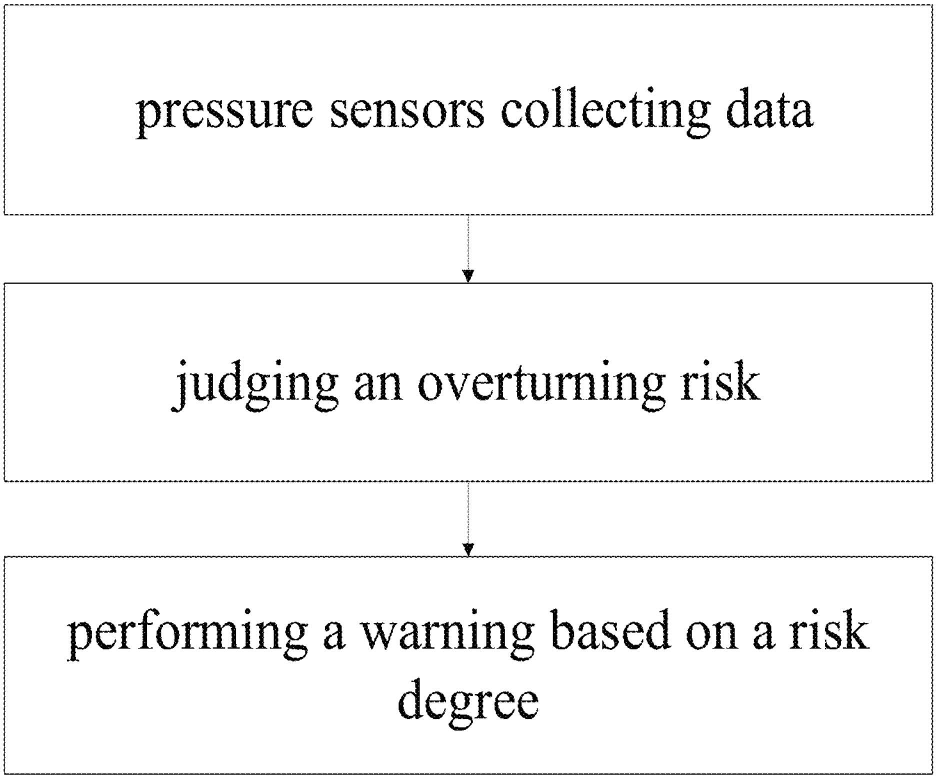
FIG. 5 is a schematic flowchart of the anti-overturning warning method for the work machine according to some other embodiments of the present application.

In some embodiments, as shown in FIG. 5, the anti-overturning warning method for the work machine 200 can be summarized into three steps: the pressure sensor collects positive pressure data, then the risk of overturning is determined, and finally warning based on the degree of risk is performed.

Figure 6:
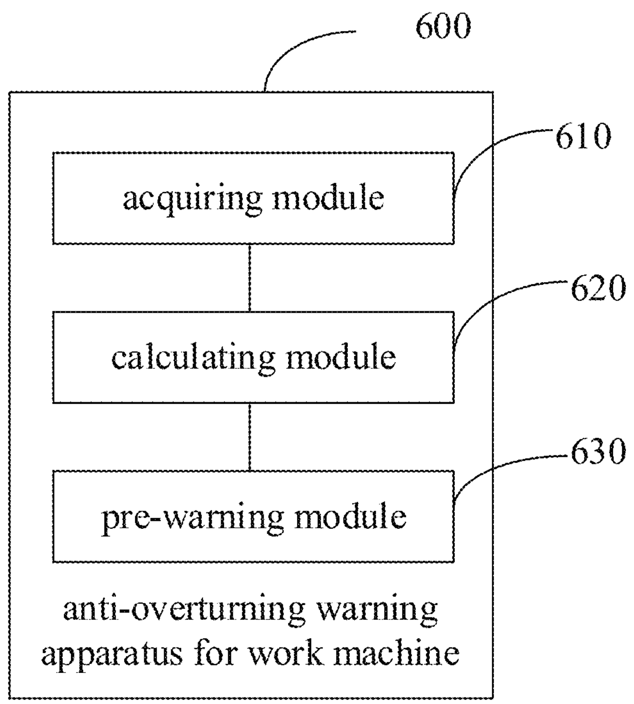
FIG. 6 is a schematic block diagram of an anti-overturning warning apparatus for the work machine according to some embodiments of the present application.

As shown in FIG. 6, the present further proposes an anti-overturning warning apparatus for the work machine, including an acquiring module 610, a calculating module 620 and a pre-warning module 630.

The acquiring module 610 is configured to acquire a plurality of positive pressures collected by a plurality of pressure sensors, and the plurality of pressure sensors are respectively provided at a plurality of supporting wheels 210 of the work machine 200.

The calculating module 620 is configured to obtain an intersection point where a gravity direction of the work machine 200 intersects a ground based on the plurality of positive pressures.

The pre-warning module 630 is configured to obtain an outer contour of the plurality of supporting wheels 210, and performing a warning of an overturning risk of the work machine 200 based on the intersection point and the outer contour of the plurality of supporting wheels 210.

In some embodiments, the calculation module 620 includes a pressure decomposition unit and an intersection coordinate calculation unit.

The pressure decomposition unit is used to decompose the plurality of positive pressures along the coordinate axis direction in the target coordinate system to obtain the plurality of horizontal axis pressures and the plurality of vertical axis pressures. The target coordinate system includes a horizontal axis and a vertical axis. The horizontal axis is the front and rear direction of the work machine 200, and the vertical axis is perpendicular to the front and rear direction of the work machine 200 and parallel to the ground. The origin of the coordinate can be the coordinate of the center point of the plurality of pressure sensors and can also be the position of the pressure sensor at the vertex supporting wheel 211.

The intersection coordinate calculation unit is used to obtain the coordinate of the intersection based on the plurality of horizontal axis pressures, the plurality of vertical axis pressures and the plurality of positive pressures.

In some embodiments, the outer contour of the plurality of supporting wheels 210 include the coordinates of the vertex supporting wheels 211 among the plurality of supporting wheels 210 in the target coordinate system.

The pre-warning module 630 includes a boundary calculation unit and a warning unit.

The boundary calculation unit is used to obtain the overturning warning boundary of the work machine 200 based on the coordinates of the vertex supporting wheels 211.

The warning unit is used to provide warning for the overturning risk of the work machine 200 based on the coordinate of the intersection point and the overturning warning boundary.

In some embodiments, the boundary calculation unit is further used to divide the coordinates of the vertex supporting wheels 211 by the target safety factor to obtain the overturning warning boundary; where the target safety factor is greater than 1.

In some embodiments, the warning unit includes an overturning classification unit and a classification warning unit.

The overturning classification unit is used to determine the overturning risk level based on the coordinates of the vertex supporting wheels 211 at the current moment, the coordinate of the intersection at the current moment, the coordinate of the intersection at the previous moment, and the difference between the current moment and the previous moment, when the coordinate of the intersection cross the overturning warning boundary.

The classification warning unit is used to provide warning based on the overturning risk level.

In some embodiments, the overturning classification unit includes an overturning time calculation unit and a risk level calculation unit.

The overturning time calculation unit is used to calculate the equivalent overturning time based on the following formula:

$$T_f = \frac{|C_e - C_O(t)|^*\Delta t}{|C_O(t) - C_O(t - \Delta t)|}$$

$T_f$ represents the equivalent overturning time, Δt represents the time difference between the current moment and the previous moment, $C_e$ represents an abscissa absolute value of the vertex supporting wheel, $C_O(t)$ represents an abscissa of the intersection point at the current moment and $C_O(t-\Delta t)$ represents an abscissa of the intersection point at the previous moment; or $C_e$ represents an ordinate absolute value of the of the vertex supporting wheel, and $C_O(t)$ represents an ordinate of the intersection point at the current moment; $C_O(t-\Delta t)$ represents an ordinate of the intersection point at the previous moment.

The risk level calculation unit is used to obtain the overturning risk level based on the equivalent overturning time, where the overturning risk level is inversely proportional to the equivalent overturning time.

The present application also provides a work machine 200, which includes the above-mentioned anti-overturning warning apparatus 600 of the work machine 200.

Furthermore, since the work machine 200 provided by the present application is equipped with the anti-overturning warning apparatus 600 of the work machine 200 as described above, it also has various advantages as mentioned above.

The electronic device and storage medium provided by the present application will be described below. The electronic device and storage medium described below and the anti-overturning warning method of the work machine described above can be mutually referenced.

Figure 7:
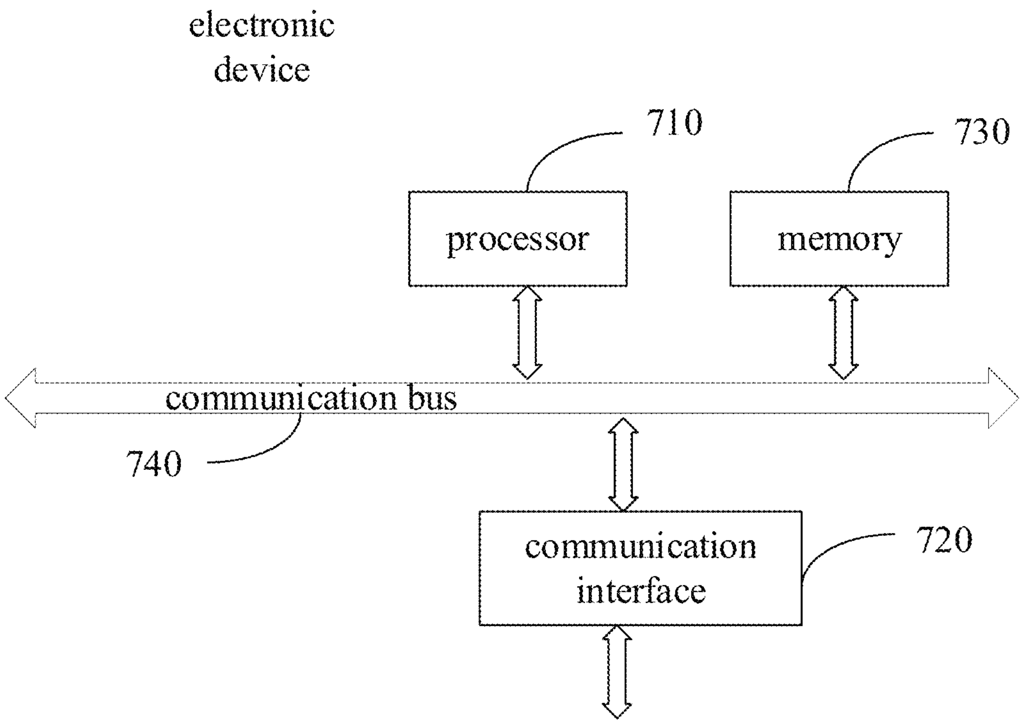
FIG. 7 is a schematic view of an electronic device according to some embodiments of the present application.

FIG. 7 illustrates a schematic diagram of the physical structure of an electronic device. As shown in FIG. 7, the electronic device may include a processor 710, a communication interface 720, a memory 730, and a communication bus 740. The processor 710, the communication interface 720, and the memory 730 complete communication with each other through the communication bus 740. The processor 710 can call the logic instructions in the memory 730 to execute the anti-overturning warning method of the work machine 200 including:

Step 110, acquiring a plurality of positive pressures collected by a plurality of pressure sensors, where the plurality of pressure sensors are respectively provided at a plurality of supporting wheels 210 of the work machine;

Step 120, obtaining an intersection point where a gravity direction of the work machine intersects a ground based on the plurality of positive pressures; and Step 130, obtaining outer contour of the plurality of supporting wheels 210, and performing a warning of an overturning risk of the work machine 200 based on the intersection point and the outer contour of the plurality of supporting wheels 210.

In addition, the above-mentioned logical instructions in the memory 730 can be implemented in the form of software functional units and can be stored in a computer-readable storage medium when sold or used as an independent product. Based on this understanding, the technical solution of the present application essentially or the part that contributes to the existing technology or the part of the technical solution can be embodied in the form of a software product. The computer software product is stored in a storage medium, including several instructions which are used to cause a computer device (which may be a personal computer, a server, or a network device, etc.) to execute all or part of the steps of the methods described in various embodiments of the present application. The aforementioned storage media include U disk, mobile hard disk, read-only memory (ROM), random access memory (RAM), magnetic disk or optical disk and other media that can store program code.

The present application also provides a computer program product. The computer program product includes a computer program stored on a non-transitory computer-readable storage medium. The computer program includes program instructions. When the program instructions are executed by a computer, the computer can execute the anti-overturning warning method for the work machine provided by each of the above methods. The method includes:

Step 110, acquiring a plurality of positive pressures collected by a plurality of pressure sensors, where the plurality of pressure sensors are respectively provided at a plurality of supporting wheels 210 of the work machine;

Step 120, obtaining an intersection point where a gravity direction of the work machine intersects a ground based on the plurality of positive pressures; and Step 130, obtaining outer contour of the plurality of supporting wheels 210, and performing a warning of an overturning risk of the work machine 200 based on the intersection point and the outer contour of the plurality of supporting wheels 210.

In another aspect, the present application also provides a non-transitory computer-readable storage medium on which a computer program is stored. When the computer program is executed by a processor, the above-mentioned anti-overturning warning method for the work machine is performed, and the method includes:

Step 110, acquiring a plurality of positive pressures collected by a plurality of pressure sensors, where the plurality of pressure sensors are respectively provided at a plurality of supporting wheels 210 of the work machine;

Step 120, obtaining an intersection point where a gravity direction of the work machine intersects a ground based on the plurality of positive pressures; and Step 130, obtaining outer contour of the plurality of supporting wheels 210, and performing a warning of an overturning risk of the work machine 200 based on the intersection point and the outer contour of the plurality of supporting wheels 210.

The device embodiments described above are only illustrative. The units described as separate components may or may not be physically separated. The components shown as units may or may not be physical units, that is, they may be located in one location, or it can be distributed across multiple network units. Some or all of the modules can be selected according to actual needs to achieve the purpose of the solution of these embodiments. Persons of ordinary skill in the art can understand and implement the method without any creative effort.

Through the above description of the embodiments, those skilled in the art can clearly understand that each embodiment can be implemented by software plus a necessary general hardware platform, and of course, it can also be implemented by hardware. Based on this understanding, the part of the above technical solution that essentially contributes to the existing technology can be embodied in the form of a software product. The computer software product can be stored in a computer-readable storage medium, such as ROM/RAM, magnetic disc, optical disk, etc., including a number of instructions to cause a computer device (which can be a personal computer, a server, or a network device, etc.) to execute the methods described in various embodiments or certain parts of the embodiments.

Finally, it should be noted that the above embodiments are only used to illustrate the technical solution of the present application, but not to limit it; although the present application has been described in detail with reference to the foregoing embodiments, those of ordinary skill in the art should understand that modifications can be made to the technical solutions described in the foregoing embodiments, or equivalent substitutions can be made to some of the technical features; however, these modifications or substitutions do not cause the essence of the corresponding technical solutions to deviate from the spirit and scope of the technical solutions of the embodiments of the present application.

What is claimed is:

1. An anti-overturning warning method for a work machine, comprising:

acquiring a plurality of positive pressures collected by a plurality of pressure sensors, wherein the plurality of pressure sensors are respectively provided at a plurality of supporting wheels of the work machine;

obtaining an intersection point where a gravity direction of the work machine intersects a ground based on the plurality of positive pressures; and obtaining an outer contour of the plurality of supporting wheels, and performing a warning of an overturning risk of the work machine based on the intersection point and the outer contour of the plurality of supporting wheels, wherein the obtaining the intersection point where the gravity direction of the work machine intersects the ground based on the plurality of positive pressures comprises:

decomposing the plurality of positive pressures along coordinate axis directions to obtain a plurality of horizontal axis pressures and a plurality of vertical axis pressures in a target coordinate system, wherein the target coordinate system comprises a horizontal axis and a vertical axis, the horizontal axis is a front and rear direction of the work machine, and the vertical axis is a direction perpendicular to the front and rear direction of the work machine and parallel to the ground; and obtaining a coordinate of the intersection point based on the plurality of horizontal axis pressures, the plurality of vertical axis pressures and the plurality of positive pressures; and wherein the outer contour of the plurality of supporting wheels comprises coordinates of vertex supporting wheels among the plurality of supporting wheels in the target coordinate system;

the performing the warning of the overturning risk of the work machine based on the intersection point and the outer contour of the plurality of supporting wheels comprises:

obtaining an overturning warning boundary of the work machine based on the coordinates of the vertex supporting wheels; and performing the warning of the overturning risk of the work machine based on the coordinate of the intersection point and the overturning warning boundary.

2. The anti-overturning warning method of claim 1, wherein the obtaining the overturning warning boundary of the work machine based on the coordinates of the vertex supporting wheels comprises:

dividing the coordinates of the vertex supporting wheels by a target safety factor to obtain the overturning warning boundary, wherein the target safety factor is greater than 1.

3. The anti-overturning warning method of claim 1, wherein the performing the warning of the overturning risk of the work machine based on the coordinates of the intersection point and the overturning warning boundary comprises:

in response to that the coordinate of the intersection point is out of the overturning warning boundary, obtaining an overturning risk level based on a coordinate of the vertex supporting wheels at a current moment, a coordinate of the intersection point at the current moment, a coordinate of the intersection point at a previous moment and a time difference between the current moment and the previous moment; and performing the warning based on the overturning risk level.

4. The anti-overturning warning method of claim 3, wherein the obtaining the overturning risk level based on the coordinate of the vertex supporting wheels at the current moment, the coordinate of the intersection point at the current moment, the coordinate of the intersection point at the previous moment and the time difference between the current moment and the previous moment comprises:

calculating an equivalent overturning time based on a following formula:

$$T_f = \frac{|C_e - C_O(t)|^* \Delta t}{|C_O(t) - C_O(t - \Delta t)|}$$

wherein $T_f$ represents the equivalent overturning time, $\Delta t$ represents the time difference between the current moment and the previous moment, $C_e$ represents an abscissa absolute value of the vertex supporting wheels, $C_O(t)$ represents an abscissa of the intersection point at the current moment and $C_O(t-\Delta t)$ represents an abscissa of the intersection point at the previous moment; or $C_e$ represents an ordinate absolute value of the vertex supporting wheels, and $C_O(t)$ represents an ordinate of the intersection point at the current moment; $C_O(t-\Delta t)$ represents an ordinate of the intersection point at the previous moment; and obtaining the overturning risk level based on the equivalent overturning time, wherein the overturning risk level has an inverse relationship with the equivalent overturning time.

5. An electrical device, comprising a memory, a processor, and a computer program stored on the memory and executable on the processor, wherein when the processor executes the computer program, steps of the anti-overturning warning method for the work machine of claim 1 are performed.

6. A non-transitory computer-readable storage medium with a computer program stored thereon, wherein when the computer program is executed by a processor, steps of the anti-overturning warning method for the work machine of claim 1 are performed.

7. An anti-overturning warning apparatus for a work machine, comprising:

an acquiring module, configured to acquire a plurality of positive pressures collected by a plurality of pressure sensors, wherein the plurality of pressure sensors are respectively provided at a plurality of supporting wheels of the work machine;

a calculating module, configured to obtain an intersection point where a gravity direction of the work machine intersects a ground based on the plurality of positive pressures; and a pre-warning module, configured to obtain an outer contour of the plurality of supporting wheels, and performing a warning of an overturning risk of the work machine based on the intersection point and the outer contour of the plurality of supporting wheels;

wherein the calculating module is further configured to decompose the plurality of positive pressures along coordinate axis directions to obtain a plurality of horizontal axis pressures and a plurality of vertical axis pressures in a target coordinate system, wherein the target coordinate system comprises a horizontal axis and a vertical axis, the horizontal axis is a front and rear direction of the work machine, and the vertical axis is a direction perpendicular to the front and rear direction of the work machine and parallel to the ground; and obtain a coordinate of the intersection point based on the plurality of horizontal axis pressures, the plurality of vertical axis pressures and the plurality of positive pressures; and wherein the outer contour of the plurality of supporting wheels comprises coordinates of vertex supporting wheels among the plurality of supporting wheels in the target coordinate system;

wherein the pre-warning module is further configured to obtain an overturning warning boundary of the work machine based on the coordinates of the vertex supporting wheels; and perform the warning of the overturning risk of the work machine based on the coordinate of the intersection point and the overturning warning boundary.

8. The work machine, comprising the anti-overturning warning apparatus for the work machine of claim 7.

* * * * *